(No Model.)
H. N. FELKEL.
TELLURIAN.
No. 408,800. Patented Aug. 13, 1889.
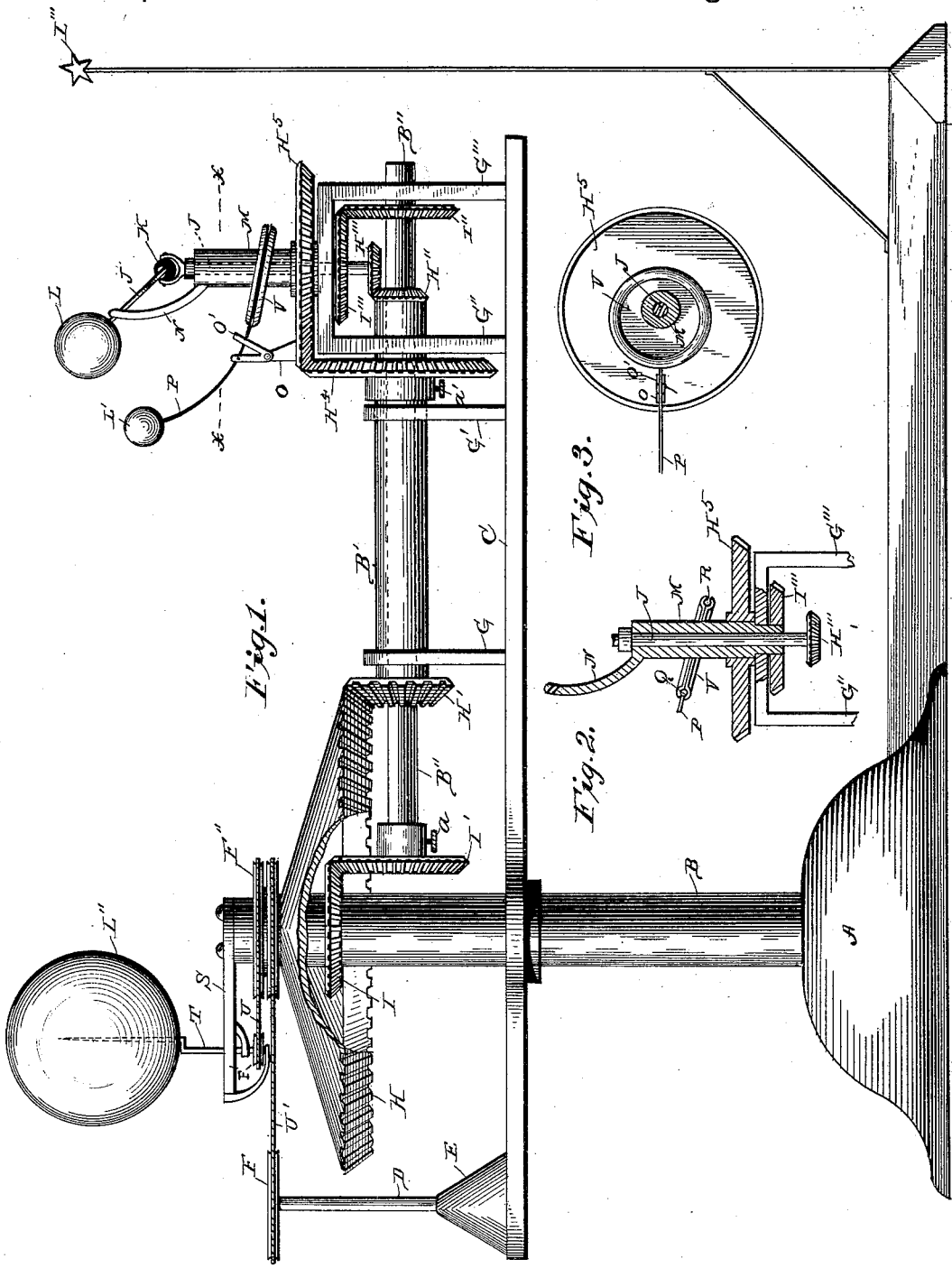
Witnesses
H. S. Rohrer.
Edward Cashman.
Inventor
Henry N. Felkel
By his Attorneys
Phillips, Van & Guckey

UNITED STATES PATENT OFFICE.

HENRY N. FELKEL, OF DE FUNIAK SPRINGS, FLORIDA.

TELLURIAN.

SPECIFICATION forming part of Letters Patent No. 408,800, dated August 13, 1889.

Application filed April 22, 1889. Serial No. 308,125. (No model.)

*To all whom it may concern:*

Be it known that I, HENRY N. FELKEL, a citizen of the United States, residing at De Funiak Springs, in the county of Walton and State of Florida, have invented certain new and useful Improvements in Tellurians; and I do hereby declare the following to be a full, clear, and exact description of the invention, such as will enable others skilled in the art to which it appertains to make and use the same.

The object of my invention is to provide a tellurian that, while simple in construction, shall serve to illustrate an unusual variety of phenomena such as engage the attention of students of elementary astronomy. It is fully shown in the accompanying drawings, in which—

Figure 1 is a side elevation of the device, a small portion being broken away to show concealed parts. Fig. 2 is a partial section through the axis of the part parallel to the plane of projection in Fig. 1. Fig. 3 is a section at $x$ $x$, Fig. 1, looking downward.

In the drawings, A is any suitable base or pedestal to which is fixed a vertical standard or shaft B. Upon this shaft is revolubly mounted a horizontal bar C, bearing at one end a non-revoluble vertical shaft D, having fixed upon its free upper end a band-pulley F. Above the bar C bevel-gears H I are fixed to the shaft B to engage, respectively, a pinion H', fixed to a hollow shaft B', revolubly mounted in rigid supports G G' G'' upon the bar, and a gear I', removably fixed upon a shaft B'', revolving in the shaft B', and a support G''', rigidly secured to the bar. The shaft B' at the end opposite the pinion H' bears a bevel-gear H'', which meshes with a like gear H''' upon a small vertical shaft J, whose upper end is connected by a universal coupling K with an oblique shaft J', bearing upon its outer end an earth-model L. The shaft B'' has fixed upon it a bevel-gear I'', engaging a like gear I''', mounted upon the lower end of a hollow shaft M, concentric with the shaft J, and having at its upper end an arm N, supporting the oblique shaft J'. Upon the shaft B', between the gears H' H'', another bevel-gear $H^4$ is adjustably fixed by a set-screw $a'$, and this engages a similar gear $H^5$, revolving about the same axis as the shafts J M. Upon the upper side of the gear $H^5$ is fixed a hinged support O for a curved rod P, that bears upon its upper and outer end a model L' of the moon. The rod rocks upon the top of this fulcrum-like support, while the hinge permits it to swing bodily inward and outward. The lower end of the rod P bears a revoluble ball Q, which travels in an internally-enlarged groove R in the edge of an inclined disk V, eccentrically fixed upon the hollow shaft M. A slotted guide O', branching out from the support O, keeps the rod at all times in the plane of this guide and the support.

Above the gears H I the shaft B bears a fixed arm S, in which is mounted a shaft T, carrying upon its upper end a model L'' of the sun. This shaft is provided with a pulley F', driven from a double pulley F''', revolubly mounted upon the shaft B and connected with it by a belt U. When the bar C is revolved, the double pulley receives motion through a belt U', passing around it and the fixed pulley upon the shaft D.

Now, in operation the bar C being revolved in its own plane, the earth and moon models will be carried bodily about the sun-model, and the latter will revolve upon its own axis under the action of the pulleys F F' F'' and their belts. At the same time the pinion H', traveling around the fixed gear H, transmits motion, through the shaft B', gears H'' H''', and coupled shafts J J', to the earth-model L, causing its comparatively rapid (diurnal) rotation upon its axis, held at an inclination of twenty-three and one-half degrees by the supporting-arm N. Meantime the gear I', traveling around the fixed gear I, imparts, through the shaft B'' and gears I'' I''', a slow rotation of the shaft M and arm N in the opposite direction, and since the gears I I' and I'' I''' are of precisely the same size this retrograde rotation is always exactly equal to the forward rotation of the arm C, and the inclined shaft J' is always parallel to itself, or points to the north pole at all times. The rotation of the shaft B', already described as causing the diurnal rotation of the earth-model, by the action of the gears $H^4 H^5$, carries the moon-model bodily around the earth-model, and during such movement the disk by its eccentricity swings the support O upon its hinge-axis, causing the moon-model to approach and recede from the earth-model, illustrating apogee and perigee. The disk, by its inclination, also rocks the rod P upon its fulcrum, and thus throws the moon-model alternately above and below the plane of the earth-model's orbit. It is also to be observed that the comparatively slow motion of the disk, already described, causes the moon's nodes to fall, as they should, at different points in the orbit of that body. It is further obvious that the sun-model being at some distance from the center of the earth-model's orbit, each revolution of the bar C shows that body in perihelion and aphelion.

The several gears are so proportioned that a single revolution of the bar C, while producing, as has been said, one contrary revolution of the shaft M, also produces about thirteen revolutions of the moon-model about the earth-model.

The set-screw $a$ being loosened, the gear I' may be disengaged from the gear I, when the arm N may be moved eastward through a small arc. The gear being then replaced and the bar C rotated, we exaggerate and illustrate in a single revolution the phenomenon of precession.

Tides, eclipses, and other lunar phenomena may be very conveniently illustrated, after loosening the milled set-screw $a'$ and disengaging the gear $H^4$, by rotating the gear $H^5$ with the thumb and finger, no change of position being required on the part of the operator.

Instead of the usual signs of the zodiac painted upon the pedestal or base, I support a star L''', from the base at a point outside the orbit of the earth-model, and by its aid precession and synodic and sidereal periods of the moon are illustrated.

It is evident that well-known mechanical expedients may in several places replace the devices I have shown—as, for example, belts may replace gears, and vice versa, or another connection may be substituted instead of the ball and groove of the rod P and disk V; and I do not therefore wish to limit myself to the exact forms shown.

What I claim as new, and desire to secure by Letters Patent, is—

1. The combination, with the shaft B, bearing the fixed gears H I, of the bar pivoted thereon, the earth and moon models mounted on geared supports borne by the bar, the shafts B' B'', mounted also upon the bar, the gear I', detachably engaging the gear I and imparting motion to the shaft B'', gearing transmitting the motion of said shaft to the earth-model support, and gearing engaging the gear H, and imparting motion, through the shaft B', to the earth-model axis and to the moon-model support.

2. The combination, with the shaft B, bearing the fixed gears H I, of the bar pivoted upon said shaft, the earth and moon models mounted in geared supports upon the bar, the independently-revoluble shafts B' B$^3$, mounted also upon the bar, the gearing engaging the gear I and imparting motion, through the shaft B'', to the earth-model support, gearing engaging the gear H and imparting motion, through the shaft B', to the earth-model axis, and the gear H$^4$, mounted upon the shaft B' and detachably engaging the geared moon-model support.

3. The combination, with the rotating moon-model support, of the jointed standard O thereon, the curved moon-model wire P, pivoted in the top of said standard and provided with the revoluble terminal ball Q, the vertical shaft M, concentric with said support and bearing the oblique earth-model axis, and the oblique disk V, eccentrically mounted upon the shaft M and receiving in its grooved edge said ball Q, whereby the rotation of said support and shaft may impart to said wire a bodily inward-and-outward movement and a distinct rocking motion upon its pivot, substantially as and for the purpose set forth.

4. The combination of the base A and the fixed shaft B rising therefrom, the gears H I, fixed thereon, the sun-model mounted at one side of said shaft, the bar C, pivotally supported upon the shaft, the fixed pulley F, supported upon the bar and rotating said sun-model by pulley-and-belt connection, the earth and moon models mounted in suitable supports upon the opposite end of the bar, gearing engaging the gears H I and transmitting suitable motion to both sun and moon models, and the star L''', supported from the base without the paths of the various models, substantially as and for the purpose set forth.

In testimony whereof I affix my signature in presence of two witnesses.

HENRY N. FELKEL.

Witnesses:
L. W. PLANK,
T. F. McGOURIN.